INVENTORS
ALI A. FIORLETTA
THOMAS P. GISMONDI
BY
*ATTORNEY*

INVENTORS
ALI A. FIORLETTA
THOMAS P. GISMONDI
BY
ATTORNEY 3,383,594
CATHODE RAY TUBE DISPLAY APPARATUS HAVING DISPLAYED COARSE VALUE DEFLECTED IN ACCORDANCE WITH FINE VARIATIONS
Ali A. Fiorietta, Jamaica, and Thomas P. Gismondi, Kings Park, N.Y., assignors to Sperry Rand Corporation, Great Neck, N.Y., a corporation of Delaware
Filed Jan. 18, 1965, Ser. No. 426,249
13 Claims. (Cl. 324—121)

ABSTRACT OF THE DISCLOSURE

Analog data conversion apparatus comprising a plurality of amplitude sensitive circuits which respond to discrete ranges of an applied signal for actuating corresponding members of pluralities of respective symbol generating and electron beam deflection circuits to form on the screen of a cathode ray tube a scale which includes the magnitude of the applied signal, the scale being controllable with regard to both the portion of the screen it occupies and the range of values it encompasses.

---

The invention herein described was made in the course of or under a contract or subcontract thereunder, with the Department of the Navy.

This invention relates in general to indicators and in particular to a cathode ray tube type indicator which is capable of displaying in response to an input signal respective portions of a related scale. Hence, it may be said that a cathode ray tube operated in accordance with the invention will provide a display equivalent to what would be seen were a peephole relatively moved along a scale in proportion to an input signal, and at a fixed distance from the scale. By means of the invention, a cathode ray tube form of the kind of indicator shown and described in U.S. Patent 3,117,312, dated Jan. 7, 1964, is provided.

Generally, the invention is based on the fact that while a scope or like device with a given viewing area may contain thereon along one of its facial axes only $n$ complete scale characters arranged as on a continuous graduated scale, if the nature of the characters on the scope face are made to change as a function of an input signal, then D.C. positioning signals for the characters in question must likewise vary, not linearly with the input, but as $n$ sawtooth functions of the input, the cyclic rate of each such function being equal to the rate at which new characters appear on the scope face divided by $n$.

In describing the invention, a simple form of indicator is discussed first with emphasis being placed on the techniques embodied. In such simple form, an input signal is made to provide a (fine) display as would be seen were a small peephole so moved along a scale that at any given time no more than one scale character may be in the view seen through the peephole. With the simple form understood, reference is then made to a generally more desirable, but more complex form of the invention, i.e. one which provides a (coarse) display in which more than one scale character appears on the cathode ray tube face at any given time.

Reasons for use of a cathode ray tube form of indicator over the indicator type of U.S. Patent 3,117,312 are manifold. For example, CRT-type display apparatus can be remotely located and the display indication projected into the field of view much in the manner of copending applications 164,769 and 374,717 (both assigned to the instant assignee), whereby not only is space more advantageously utilized, but other displays are enhanced to provide a complete overall integrated display system. Also, a single cathode ray tube may be time-shared for plural different scales, thereby further minimizing space requirements and needed display apparatus. Also, the resolution of any one given display can easily be made adjustable from say a coarse to a fine indication by merely changing the number of characters which may appear on the cathode ray tube face; in contrast to this, the resolution of an indicator of the type shown in U.S. Patent 3,117,312 is generally fixed. Many other advantages will be apparent from a reading of the specification.

A principal object of the invention is to provide an improved form of indicator.

Another object of the invention is to provide a cathode ray tube indicator that displays in response to an input signal a respective portion of a related scale.

Another object of the invention is to provide minimal means for providing a cathode ray tube indicator that displays in response to an input signal a respective portion of a related scale.

Another object of the invention is to provide a cathode ray tube indicator that displays more or less of a scale depending respectively on whether a coarse or fine display is desired.

The invention will be described with reference to the figures wherein.

Figure 1:
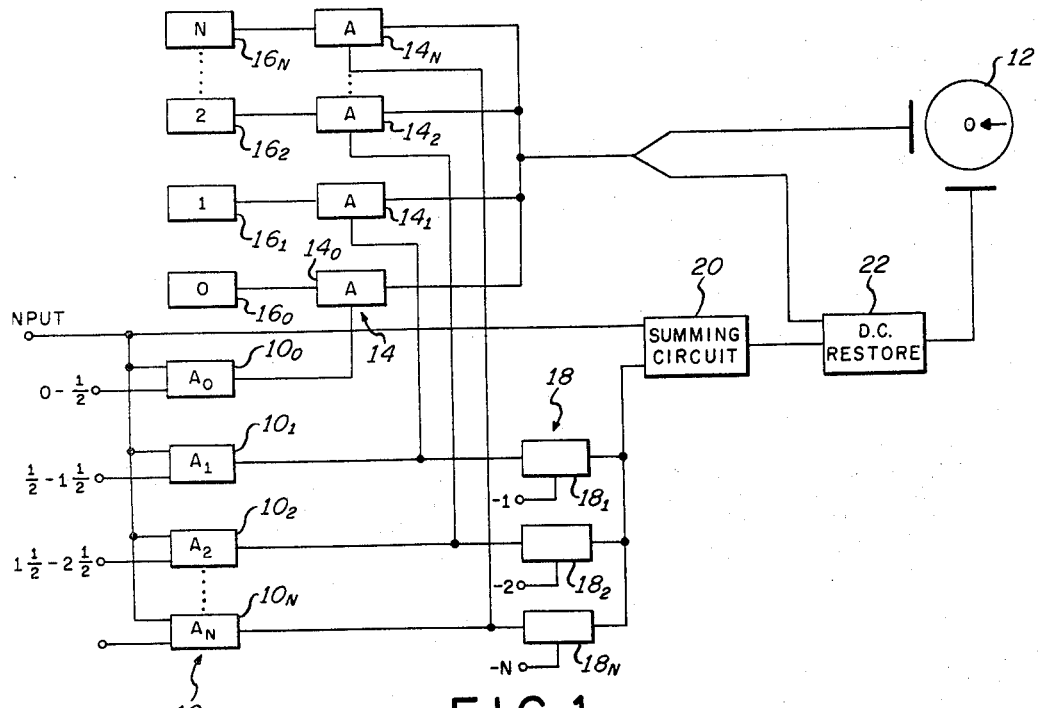
FIG. 1 is a block diagram of a simple form of the invention.

Referring now to FIG. 1, a plurality of AND function circuits 10 are arranged to receive simultaneously an applied signal the magnitude of which is displayed on the face of a cathode ray tube 12. Each AND function circuit 10 is adapted to provide an output signal for a respective range of the input signal, and each circuit 10 may for example comprise a flip-flop tandemly connected to a respective input threshold circuit biased to pass a different range of the input signal. The AND function circuits 10 connect to apply their output signals to respective AND function circuits 14, and each AND circuit 14 may for simplicity of understanding be considered to be either one, or two, simple relay-operated switches. Each AND function circuit 14 is continually excited by signals provided by a circuit 16 for generating a respective scale character, and all such respective characters when taken together form the entire scale, portions of which the present invention is adapted to display. Character generating circuits themselves form no part of the present invention, being well-known in the art and may for example be circuits for exciting the deflection circuits of the CRT 12 in accordance with well-known Lissajous principles; for example, the character "0" may be provided by applying sine and cosine signals simultaneously through (two switch-like) circuits $14_0$ respectively to the X- and Y-deflection circuits of the tube 12 (which deflection circuits may be either electrostatic or electromagnetic); the character "1" may for example be provided by applying a sine wave signal through (just one switch-like) circuit $14_1$ to the Y-deflection circuit of the tube 12; the character "2" may for example be provided by simultaneously applying through (two switch-like) AND circuits $14_2$ a sawtooth signal to the tube Y-deflection circuit and a sine signal to the tube X-deflection circuit, etc.

X-axis character generating signals in this form of the invention are applied directly to the tube deflection circuits, but Y-axis character generating signals first have their respective D.C. levels adjusted before being applied thereto, whereby such D.C. levels cause the characters to locate properly on the face of the tube 12.

Y-axis D.C. positioning signals, like the character generating signals themselves, are determined by the input signal, but unlike the character generating signals (which constantly represent higher and higher scale numbers as the input signal increases), they vary in sawtooth fashion as a function of the input signal as stated above.

In understanding the following, it is to be borne in mind that a normalized form of equipment is described, with an applied input signal of one volt deflecting the beam of the cathode ray tube diametrically from one side of the tube face to the other.

To provide sawtooth signals which vary as functions of the input signal, AND functions circuits 18 (which once again for simplicity of understanding may be considered to be relay-operated switches) are selectively operated by signals appearing at the output of respective circuits 10 to apply respective D.C. signal levels to a summing circuit 20 already receiving the input signal. No AND circuit 18 cooperates with the circuit $10_0$ for a reason which will be apparent below. The resultant D.C. output signal from the summing circuit 20 is combined (in what is functionally called a D.C. restorer 22) with the Y-axis character generating (A.C.) signal provided by the appropriate gate circuit 14, and then applied as a composite signal to the tube Y-axis deflection circuit.

Figure 2:
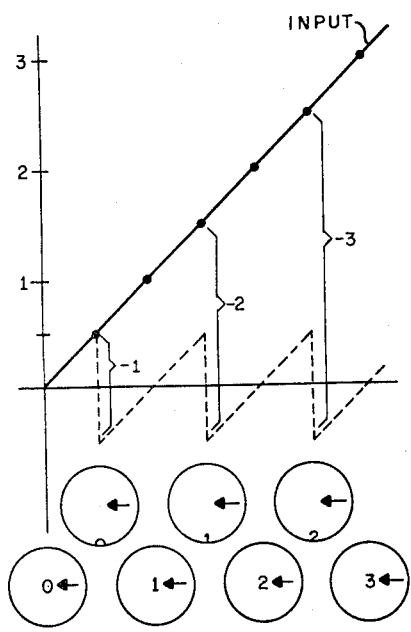
FIG. 2 is a signal diagram useful in describing the apparatus of FIG. 1.

To understand the operation of the circuit of FIG. 1, reference should now be had also to the diagram of FIG. 2. With no input signal applied to the circuit of FIG. 1, the AND function circuit $10_0$ arms the gate $14_0$ so that the character generating circuit $16_0$ applies its signals through the gate $14_0$, and because no D.C. positioning voltages are applied to the Y-deflection circuit of the tube 12 at this time, a zero appears in the center of the tube 12 face adjacent a reference index which may for example be a scratch on the tube face. As the input signal increases to ½ volt, the character "0" floats downward on the tube face away from the index so that at an input signal of ½ volt, the zero disappears from the tube face. As the character "0" disappears, the AND function circuit $10_0$ readies to disarm the circuit $14_0$, and the circuit $10_1$ readies to arm the circuit $14_1$, whereupon the character generating circuit $16_1$ applies its output signals to the deflection circuits of the tube 12. As the gate $14_1$ gets armed, so too is the circuit $18_1$, causing a $-1$ volt signal to be summed with the $+\frac{1}{2}$ volt input signal, thereby causing a $-\frac{1}{2}$ volt D.C. positioning signal to be applied to the tube deflection circuits and causing a "1" (scribed by the signals from the circuit $16_1$) to appear at the top of the tube 12 face. At an input signal of 1 volt, the summing circuit 20 has a zero output, causing the character "1" to reside properly at the central reference position on the tube face.

As the input signal continues to increase, the above described cycle of operation is repeated, however for higher order scale characters. That is, when the input signal reaches 1½ volts, the "1" disappears and the "2" character readies to appear on the tube face; when it does appear it locates near the top of the tube face by application of a resultant $-\frac{1}{2}$ volt signal to the Y-deflection circuit, i.e. a $-2$ volt signal provided by the gate $18_2$ to the summing circuit 20 plus the input signal of 1½ volts equals $-\frac{1}{2}$ volt, etc.

Figure 3:
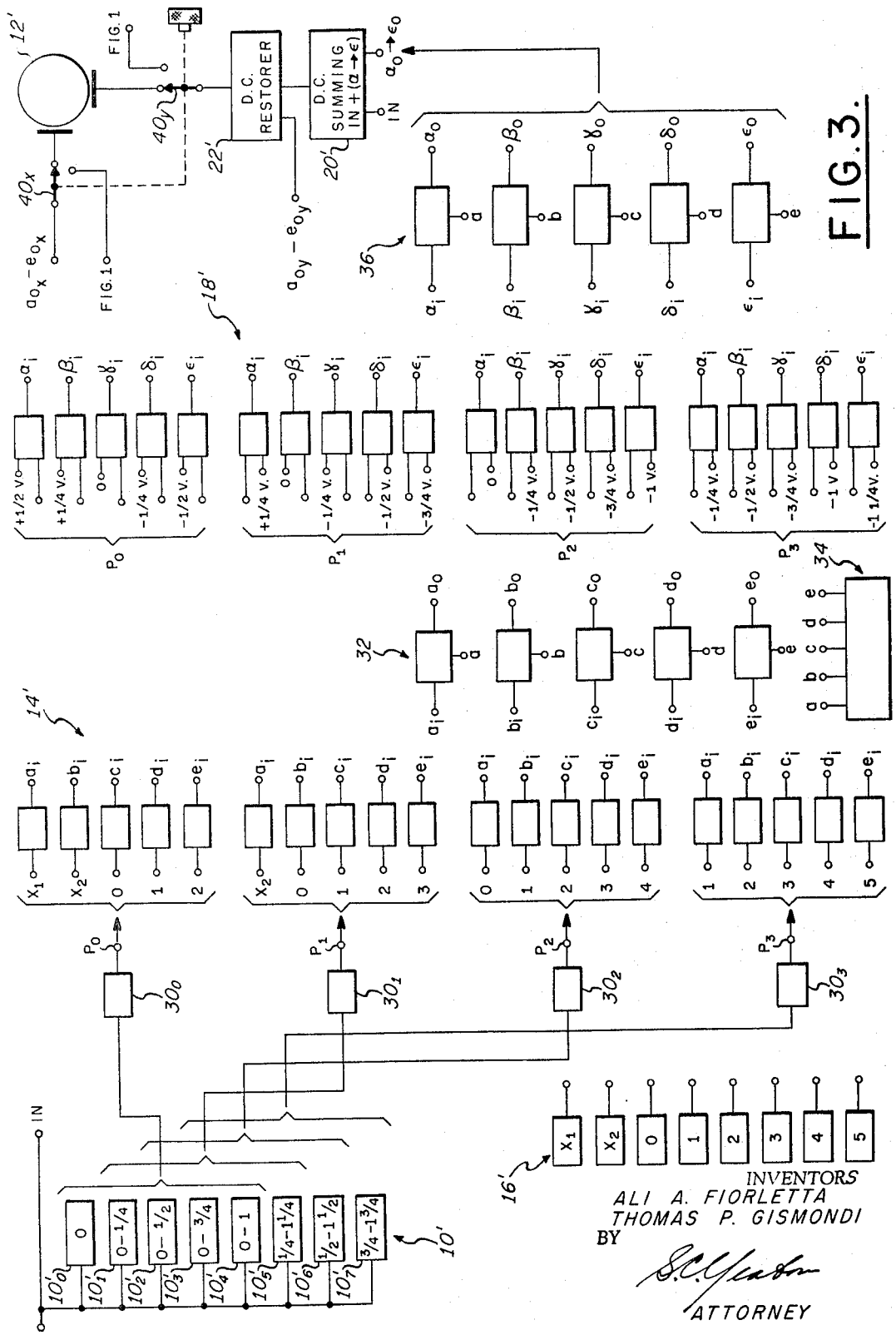
FIG. 3 is a block diagram of a generally preferred form of the invention.

With the apparatus of FIG. 3, a display is provided which embraces either four complete scale characters, or three complete scale characters and parts of two others, i.e. $n=4$. A scale display of this type is desired over the type provided by the apparatus of FIG. 1 because here ambiguity in reading the scale is minimized, whereas the scale display of FIG. 1 is somewhat confusing at the instant one character disappears and another starts to come into view.

Since in this form of the invention, parts of no more than five scale characters may be seen at any one time, AND function circuits 10' responsive to the level of an input signal are arranged in groups of five, each group being responsive to a range of input signal levels different from that to which the other groups are responsive. That is, the group of AND function circuits $10_0'$ through $10_4'$ is responsive within the input signal range of 0 to 1 volt; the group of AND function circuits $10_1'$ through $10_5'$ is responsive within the input signal range of ¼ to 1¼ volts; etc.

Each group of AND function circuits 10' couples to a respective AND circuit 30, and depending on which of the AND circuits 30 is excited by a complete group of AND function circuits 10', signals are applied to just one of four points $P_0$ through $P_3$.

Circuits 16' for providing scale character generating signals for scribing the characters $X_1$ through 5 are connected in groups of five to AND gates 14', to which are also applied the signals from the AND gates 30 which appear at points $P_0$ to $P_3$. Therefore, when the input signal is below ¼ volt, signals for generating the characters $X_1$, $X_2$, 0, 1 and 2 appear on gate 14' contacts $a_1$ through $e_1$ respectively; when the input signal is between ¼ volt and 1¼ volts, signals for generating the characters $X_2$, 0, 1, 2 and 3 appear respectively on the contacts $a_1$ through $e_1$; when the input is between ½ volt and 1½ volts, signals for generating the characters 0, 1, 2, 3 and 4 appear respectively on the contacts $a_1$ through $e_1$; etc.

Five AND gate circuits 32 connect to receive the output signals which appear on the leads $a_1$ through $e_1$ of the gate circuits 14', and they themselves apply their input signals to their output leads $a_0$ through $e_0$ when they are respectively pulsed by signals appearing on leads $a$ through $e$. Signals appearing on leads $a$ through $e$ of the gate circuits 32 are sequentially applied thereto by means of a circuit 34, which may be of the form shown and described re FIG. 5$a$ (elements 180, 182, 184) of copending application S.N. 374,717. Hence at all times, signals for generating different sets of five scale characters are available on the leads $a_0$ through $e_0$, and these signals, their respective X- and Y-components, are applied respectively to the X-axis deflection circuit and to the Y-axis deflection circuit of a cathode ray tube 12', the latter signal component being applied however via a functional block 22' designated a D.C. restorer.

Aside from gating (to the tube 12' deflection circuits) the proper signals for generating scale characters on the face of the tube, the signals appearing at the points $P_0$ through $P_3$ also gate appropriate related bias signals to the tube deflection circuits, which signals combine with the input signal to position properly the scale characters on the tube 12' face. That is, depending on the magnitude of the input signal, the bias signals which are gated through the circuits 18' and appear on leads $\alpha_1$ through $\epsilon_1$ will vary. These positioning bias signals are sampled simultaneously with related character generating signals by means of sequencing signals being provided by the circuit 34 and applied to the gate circuits 36. As aforesaid, the bias signals which are gated through the circuits 18' and 36 are combined algebraically with the input signal in a D.C. summing circuit 20', the output of which is applied to the block 22' designated a D.C. restorer.

Figure 4:
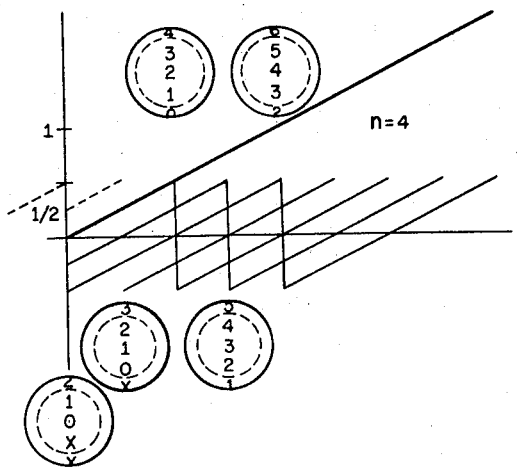
FIG. 4 is a signal diagram useful in describing the apparatus of FIG. 3.

Understanding the workings of the circuit of FIG. 3 is best appreciated with reference also to FIG. 4. With the input signal at zero, point $P_0$ gates character generating signals through the circuits 14' to the gate circuits 32; simultaneously, bias signals of $+\frac{1}{2}$, $+\frac{1}{4}$, 0, $-\frac{1}{4}$ and $-\frac{1}{2}$ volt are gated to the gate circuits 36. As the circuit 34 sequentially opens both gates 32 and 36, a portion of $X_1$ is scribed on and positioned near the base of the tube 12' face by a resultant positioning voltage of $+\frac{1}{2}$ volt; then the character $X_2$ is scribed on the tube face, but positioned midway between the center of the tube face and its circumferential portion, this being because the resultant D.C. signal here is $+\frac{1}{4}$ volt (or just half that needed to deflect the beam of the tube from its central quiescent position to the circumference of the tube face); then the scale character "0" is scribed at the central quiescent point on the tube face since no resultant D.C. is applied to the tube deflection circuit when the input is below ¼ volt and the character "0" is scribed. The characters "1" and "2" are similarly scribed and positioned, such positioning being respectively in response to −¼ and −½ resultant voltages being applied to the Y-axis deflection circuits of the tube 12′.

As the input signal increases above zero (though still below +¼ volt) the five characters $X_1$, $X_2$, 0, 1 and 2 shift position downward on the tube face, with $X_1$ gradually disappearing off the tube face and the character "2" gradually coming into full view. At the instant the input signal reaches +¼ volt, the point $P_0$ gets de-energized and the point $P_1$ gets energized to cause the character 3 to start to appear on the tube 12′ face as the character $X_1$ starts to disappear. That is, with an input signal of +¼ volt, the characters $X_2$, 0, 1, 2 and 3 are properly positioned respectively by resultant voltages of ¼+¼=½, ¼+0=¼, ¼−¼=0, ¼−½=−¼ and ¼−¾=−½, which it is to be noted are the same resultant voltages as positioned the characters $X_1$ through 2 when the input signal was zero volts. The above operation is then repeated for levels of the input signal greater than ½ volt etc.

In understanding the invention of FIG. 3, appreciation must be had of the fact that once the character which had originally appeared at the reference position on the tube face disappears, a different character will come to occupy that reference position, while a new character will start to appear on the tube face. Hence, the resultant positioning voltages will have to vary sawtooth-wise, regardless of the fact that the input signal steadily increases, just to position properly the characters which appear on the tube face. To appreciate that there are $n$ sawtooth functions, reference should be had to the nature of the biases applied to the gate circuits 18′, note being made both of the fact that each given bias shifts location within the groups each time a new group is excited, and that it takes four ($n$) ¼ volt increasing changes of the input signal level to cease using any given bias. Note also that the character generating signals likewise shift location with respect to the gates 14′ each time a new group thereof is excited, and that it takes four ($n$) ¼ volt increasing changes of the input signal level to eliminate use of any given character generating signals.

FIG. 3 is shown provided with switches 40 to emphasize that a coarse display, as would be provided by this apparatus of FIG. 3, may be made fine in the manner taught in relation to FIG. 1.

In view of the nature of the invention effort has been made to teach the functions involved rather than details of apparatus which may easily be changed within the scope of the invention. For example additional indicia may be employed with the scale of FIG. 3 and/or the characters $X_1$ and $X_2$ (subscripts are meaningless and are used just to distinguish the X's from each other) may be eliminated entirely since they serve only to teach the meaning of "$n$ characters"; also, all gates 18′ receiving biases of zero volts may obviously be eliminated; also, the reference location may be biased to a non-central part of the tube, and plural and/or other scales may be made to run sidewise etc. on the tube face; also the scale itself instead of being a linear type display may be of a logarithmic type by simply rearranging the biases applied to the gates 18′ in a manner to change the spacing between the successive sawtooths of FIG. 4, etc.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Analog data conversion apparatus comprising a plurality of circuits for providing respective notations representative of discrete signal magnitudes, display means, first means responsive to an applied input signal for selectively connecting to said display means the circuit that provides the notation representative of the discrete signal magnitude closest in value to the magnitude of the input signal, and second means responsive to the input signal for positioning the notation that appears on said display means relative to a reference location in proportion to the disparity between the input signal and said closest discrete signal magnitude, said second means including means for selecting one of a plurality of discrete bias signals in accordance with the magnitude of the input signal and means for summing the input signal and selected bias signal.

2. Analog data conversion apparatus for indicating the magnitude of an applied input signal comprising a cathode ray tube having beam deflection means, means for providing a plurality of signals for scribing respective scale characters on the face of said tube, which scale characters represent discrete magnitudes of the input signal, first means responsive to said input signal for applying to said beam deflection means sufficient signals for scribing the scale character representing the discrete signal magnitude nearest in value to the magnitude of said input signal, and second means responsive to said input signal for applying to said beam deflection means a signal for positioning the scribed character, with respect to a reference location on the tube face, in proportion to the difference between the magnitude of said input signal and the discrete signal magnitude the character of which is scribed on the tube face, said second means including means for selecting one of a plurality of discrete bias signals in accordance with the magnitude of the input signal and means for summing the input signal and selected bias signal.

3. Analog data conversion apparatus for displaying the magnitude of an input signal comprising a plurality of circuits for producing respective notations representative of discrete signal magnitudes, display means, first means responsive to said input signal for selectively connecting to said display means only those several circuits that produce notations representative of discrete signal magnitudes which are close in value to the magnitude of the input signal, and second means responsive to the input signal for positioning the notations that appear on said display means relative to each other by an amount proportional to the difference between discrete signal magnitudes and with respect to a reference location on said display means by an amount dependent on the difference between the magnitude of the input signal and the nearest discrete signal magnitude with respect thereto, said second means including means for selecting several bias signals from a plurality of discrete bias signals, the selected bias signals being related in a prescribed manner to said notations representative of discrete signal magnitudes which are close in value to the magnitude of the input signal, and means for summing the input signal with each of the selected bias signals.

4. Analog data conversion apparatus for indicating the magnitude of an applied input signal comprising a cathode ray tube having beam deflection means, means for providing a plurality of signals for scribing respective scale characters on the face of said tube, which scale characters represent discrete magnitudes of the input signal, first means responsive to said input signal for applying to said beam deflection means signals for scribing scale characters representing only those several discrete signal magnitudes close in value to the magnitude of said input signal, and second means responsive to said input signal for applying to said beam deflection means signals for positioning the scribed characters with respect to each other by amounts proportional to the difference between discrete signal magnitudes and with respect to a reference location on the tube face by amounts dependent on the difference between the magnitudes of said input signal and the discrete signal magnitude nearest in value to the magnitude of the input signals, said second means including means for selecting several bias signals from a plurality of discrete bias signals, the selected bias signals being related in a prescribed manner to said several discrete signal magnitudes close in value to the magnitude of the input signal, and means for summing the input signal with each of the selected bias signals.

5. Analog data conversion apparatus that displays in response to an input signal a range of scale indications, which range of indications forms part of a scale and includes indicia representative of the input signal, comprising display means, a plurality of circuits for providing signals for placing characters on said display means, which characters are representative of respective indicia on said signal, respective gate circuit means for each of said plurality of circuits for connecting said plurality of circuits to said display means, respective means for each of said gate circuit means for selectively enabling those means, said respective means for enabling the gate circuit means being each responsive to different respective ranges of the input signal such that at any given instant only one of said plurality of circuits is connected to said display means, and means for positioning the character which most nearly is representative of the magnitude of the input signal, relative to a reference location on said display means, in proportion to the error between the input signal magnitude and the signal magnitude represented by that character, said positioning means including means for selecting one of a plurality of discrete bias signals in accordance with the magnitude of the input signal and means for summing the input signal and selected bias signal.

6. Analog data conversion apparatus that displays in response to an input signal a range of scale indications, which range of indications forms part of a scale and includes indicia representative of the input signal, comprising a cathode ray tube having beam deflection means, a plurality of circuits for providing signals to said deflection circuit means for placing characters on the face of said cathode ray tube, which characters are representative of respective indicia on said scale, respective gate circuit means for each of said plurality of circuits for connecting said plurality of circuits to said deflection circuit means, respective means for each of said gate circuit means for selectively enabling those means, said respective means for enabling the gate circuit means being each responsive to different respective ranges of the input signal such that at any given instant only one of said plurality of circuits is connected to said deflection circuit means, and means for applying to said deflection circuit means a signal for positioning on the face of said cathode ray tube the character which most nearly is representative of the magnitude of the input signal, said positioning being relative to a reference location on the face of said cathode ray tube in proportion to the error between the input signal magnitude and the signal magnitude represented by that character, said last-mentioned means including means for selecting one of a plurality of discrete bias signals in accordance with the magnitude of the input signal and means for summing the input signal and selected bias signal.

7. Analog data conversion apparatus that displays in response to an input signal a range of scale indications, which range of indications forms part of a scale and includes indicia representative of the input signal, comprising display means, a plurality of circuits for providing signals for placing characters on said display means, which characters are representative of respective indicia on said scale, respective gate circuits means for each of said plurality of circuits connecting said plurality of circuits to said display means, respective means for each of said gate circuit means for selectively enabling those means, said respective means for enabling the gate circuit means being each responsive to different respective ranges of the input signal, and said respective ranges overlapping such that at any given instant several characters are placed on said display means, and means for positioning the characters which appear on said display means relative to each other in proportion to the spacing between adjacent scale indicia and for positioning the character which most nearly is representative of the magnitude of the input signal relative to a reference location on said display means in proportion to the error between the input signal magnitude and the signal magnitude represented by that character, said positioning means including means for selecting several bias signals from a plurality of discrete bias signals, the selected bias signals being related in a prescribed manner to said range of scale indications, and means for summing the input signal with each of the selected bias signals.

8. Analog data conversion apparatus that displays in response to an input signal a range of scale indications, which range of indications forms part of a scale and includes indicia representative of the input signal, comprising a cathode ray tube having deflection circuit means, a plurality of circuits for providing signals to said deflection circuit means for placing characters on the face of said cathode ray tube, which characters are representative of respective indicia on said scale, respective gate circuit means for each of said plurality of circuits connecting said plurality of circuits to said deflection circuit means, respective means for each of said gate circuit means for selectively enabling those means, said respective means for enabling the gate circuit means being each responsive to different respective ranges of the input signal and said respective ranges overlapping such that at any given instant several characters are placed on the face of the cathode ray tube, and means for applying to said deflection circuit means signals for positioning the characters which appear on the face of said cathode ray tube relative to each other in proportion to the spacing between adjacent scale indicia and for positioning the character which most nearly is representative of the magnitude of the input signal relative to a reference location on the face of said cathode ray tube in proportion to the error between the input signal magnitude and the signal magnitude represented by that character, said last-mentioned means including means for selecting several bias signals from a plurality of discrete bias signals, the selected bias signals being related in a prescribed manner to said range of scale indications, and means for summing the input signal with each of the selected bias signals.

9. Analog data conversion apparatus for indicating the magnitude of an applied input signal comprising a cathode ray tube having beam deflection means, means for providing a plurality of signals for scribing respective scale characters on the face of said tube, which scale characters represent discrete magnitudes of the input signals, first means responsive to said input signal for applying to said beam deflection means sufficient signals for scribing the scale character representing the discrete signal magnitude nearest in value to the magnitude of said input signal, and second means responsive to said input signal for applying a resultant biasing signal to said beam deflection means to position the scribed character with respect to a reference location on the tube face in proportion to the difference between the magnitude of said input signal and the discrete signal magnitude the character of which is scribed on the tube face, said second means comprising means for producing in response to the magnitude of the input signal respective bias signals which are multiples of the bias signal needed to move the scribed character across a prescribed portion of the viewing aperture of said cathode ray tube face, and means for algebraically summing the input signal and the respective bias signals to produce the resultant biasing signal, which signal varies in sawtooth fashion when the magnitude of the input signal increases.

10. Analog data conversion apparatus for indicating the magnitude of an applied input signal comprising a cathode ray tube having beam deflection means, means for providing a plurality of signals for scribing respective scale characters on the face of said tube, which scale characters represent discrete magnitudes of the input signal, first means responsive to said input signal for providing signals for scribing scale characters representing only those several discrete signal magnitudes close in value to the magnitude of said input signal, and second means responsive to said input signal for producing resultant biasing signals for positioning the scribed characters on the face of the tube with respect to each other in proportion to the difference between discrete signal magnitudes and with respect to a reference location on the tube face by amounts dependent on the difference between the magnitudes of said input signal and the discrete signal magnitude nearest in value to the magnitude of the input signal, said second means comprising means for producing in response to the magnitude of the input signal respective bias signals which are multiples of the quotient of the bias signal needed to move any one scribed character across a prescribed portion of the viewing aperture of said cathode ray tube face divided by the number of characters appearing on said prescribed portion, and means connected to receive the input signal and the signals from said means for producing respective bias signals algebraically summing those signals to produce the resultant biasing signals, which signals vary in sawtooth fashion when the magnitude of the input signal increases, and time delay means for sequentially applying the several respective character scribing signals and their related bias signals to said beam deflection means.

11. The apparatus of claim 6 wherein said means for applying a positioning signal to said deflection circuit means comprises means for producing in response to the magnitude of the input signal respective bias signals which are multiples of the bias signal needed to move the scribed character across the prescribed portion of the viewing aperture of said cathode ray tube face, and means connected to receive both the input signal and the signals from said means for producing respective signals for algebraically summing those signals to produce a resultant biasing signal, which signal varies in sawtooth fashion when the magnitude of the input signal increases.

12. The apparatus of claim 8 wherein said means for applying positioning signals to said deflection circuit means comprises means for producing in response to the magnitude of the input signal respective bias signals which are multiples of the quotient of the bias signal needed to move any one scribed character across a prescribed portion of the viewing aperture of said cathode ray tube face divided by the number of characters appearing on said prescribed portion, and means connected to receive the input signal and the signals from said means for producing respective bias signals for algebraically summing those signals to produce the resultant biasing signals, which signals vary in sawtooth fashion when the magnitude of the input signal increases, and time delay means for sequentially applying the several respective character scribing signals and their related bias signals to said beam deflection means.

13. The apparatus of claim 6 including selector means for connecting more and less of said plurality of circuits to said deflecting circuit means depending respectively on whether a coarse or fine display is desired.

References Cited

UNITED STATES PATENTS 811,665   10/1957   McNaney _____ 324—121 X

RUDOLPH V. ROLINEC, *Primary Examiner.*

ARCHIE R. BORCHELT, *Examiner.*

E. F. KARLSEN, *Assistant Examiner.*